United States Patent
Gehtman et al.

(10) Patent No.: US 12,547,715 B2
(45) Date of Patent: Feb. 10, 2026

(54) STORAGE IDENTITY VALIDATION FOR A SUPPLY CHAIN

(71) Applicant: Dell Products, L.P., Round Rock, TX (US)

(72) Inventors: Yevgeni Gehtman, Modi'in (IL); Tomer Shachar, Omer (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 237 days.

(21) Appl. No.: 17/659,938

(22) Filed: Apr. 20, 2022

(65) Prior Publication Data

US 2023/0342467 A1  Oct. 26, 2023

(51) Int. Cl.
*G06F 21/57* (2013.01)
*G06F 21/56* (2013.01)
*G06Q 30/018* (2023.01)

(52) U.S. Cl.
CPC .......... *G06F 21/566* (2013.01); *G06F 21/577* (2013.01); *G06Q 30/0185* (2013.01); *G06F 2221/033* (2013.01)

(58) Field of Classification Search
CPC .......... G06F 21/00; G06F 21/44; G06F 21/57; G06F 21/70; G06F 21/71; G06F 21/73; G06F 21/88; G06F 21/566; G06F 21/577; G06F 2221/033; G06Q 30/0185
See application file for complete search history.

(56) References Cited

U.S. PATENT DOCUMENTS

| | | | |
|---|---|---|---|
| 8,621,212 B2* | 12/2013 | Lim | H04L 9/3271 713/168 |
| 9,230,137 B2* | 1/2016 | Berke | G06F 21/572 |
| 10,152,264 B1* | 12/2018 | Butcher | G06F 9/4401 |
| 10,181,124 B2* | 1/2019 | Berke | G06Q 30/018 |
| 2014/0157000 A1* | 6/2014 | Buer | G06F 21/572 713/189 |
| 2017/0237568 A1* | 8/2017 | Morris | H04L 9/0866 713/168 |
| 2019/0392148 A1* | 12/2019 | Ganesan | G06F 9/4411 |
| 2020/0183594 A1* | 6/2020 | Gyllenskog | G11C 16/3431 |
| 2022/0114870 A1* | 4/2022 | Beck | G08B 13/06 |
| 2022/0129391 A1* | 4/2022 | Shiner | H04W 12/61 |

\* cited by examiner

*Primary Examiner* — Daniel B Potratz
(74) *Attorney, Agent, or Firm* — Fogarty LLP

(57) ABSTRACT

Systems and methods for validating digital components comprise manufacturing a digital component for a computer network, wherein the digital component includes embedded software, creating a unique digital identity for the digital component using parameters of the embedded software, and storing the unique digital identity to a global repository. The method further comprises shipping the digital component to an end user, receiving a query at the global repository to verify an installed digital identity associated with a component being installed in an end user network, and determining whether the installed digital identity matches the unique digital identity. The digital component may be a storage system. The computer network may be a data center or an information handling system (IHS).

14 Claims, 4 Drawing Sheets

STORAGE IDENTITY VALIDATION FOR A SUPPLY CHAIN

FIELD

The present invention relates to the field of information technology, including, more particularly, to systems and techniques for detecting tampering with storage systems in a supply chain.

BACKGROUND

A supply chain includes the activities required by an organization to deliver goods or services to a consumer. The supply chain includes the steps from obtaining raw materials or component parts through to finished products or services that are delivered to the consumer. This includes transportation stages in which goods pass through warehouses and are moved from one location to another. Supply chain cybersecurity risks include insertion of counterfeits, unauthorized production, tampering, theft, insertion of malicious software, and hardware. Security breaches may occur when a hacker or malicious user accesses goods in transit between a manufacturer and an end user. In the case of computer and network components, an attacker may embed malicious software or hardware in the goods before they arrive at a customer's data center. A target company would likely have a cybersecurity system to keep out a malicious user's direct attack; however, the attacker could install malicious software into components that are moving in third-party channels in the supply chain, which are not controlled by the manufacturer or customer. Such malicious software would not be readily detected by the customer and may then be unintentionally introduced into the customer's network or data center simply by installing a "new" but infected component that appears to have been received directly from the manufacturer.

SUMMARY

In one example, a method for validating digital components comprises manufacturing a digital component for a computer network, wherein the digital component includes embedded software, creating a unique digital identity for the digital component using parameters of the embedded software, and storing the unique digital identity to a global repository. The method further comprises shipping the digital component to an end user, receiving a query at the global repository to verify an installed digital identity associated with a component being installed in an end user network, and determining whether the installed digital identity matches the unique digital identity. The digital component may be a storage system. The computer network may be a data center or an information handling system (IHS).

The embedded software may comprise a BIOS, kernel, operating system, and firmware. The unique digital identity may be created using a cryptographic hash function applied to parameters of the embedded software. A salting parameter may be added to parameters of the embedded software to create the unique digital identity. The unique digital identity may be signed with a certificate from a manufacturer of the digital component.

The digital component is under a manufacturer's control and is not shipped to the end user until the unique digital identity is stored to the global repository. The global repository can be a global digital identity table. The end user network may be a data center. The query received at the global repository may be sent from the digital component or from a data center in which the digital component is being installed. The query received at the global repository may comprise the installed digital identity. The query received at the global repository may alternatively comprise parameters of embedded software from a storage system being installed at a data center, and wherein the parameters of the embedded software are used to generate an installed digital identity for verification.

In another example, a method for verification of a storage system comprises identifying a storage system being installed in a data center, extracting parameters of software embedded on the storage system, and sending the parameters to a repository of digital identities for verification of the storage system. The parameters are sent to the repository as a calculated digital identity that is generated using a cryptographic hash function applied to the parameters. The parameters are sent to the repository via a cybersecurity system. An alert indicating a supply chain vulnerability is sent if the parameters are not verified for the storage system. A response indicating approval of the storage system is sent if the digital identity has been verified.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

Figure 1:
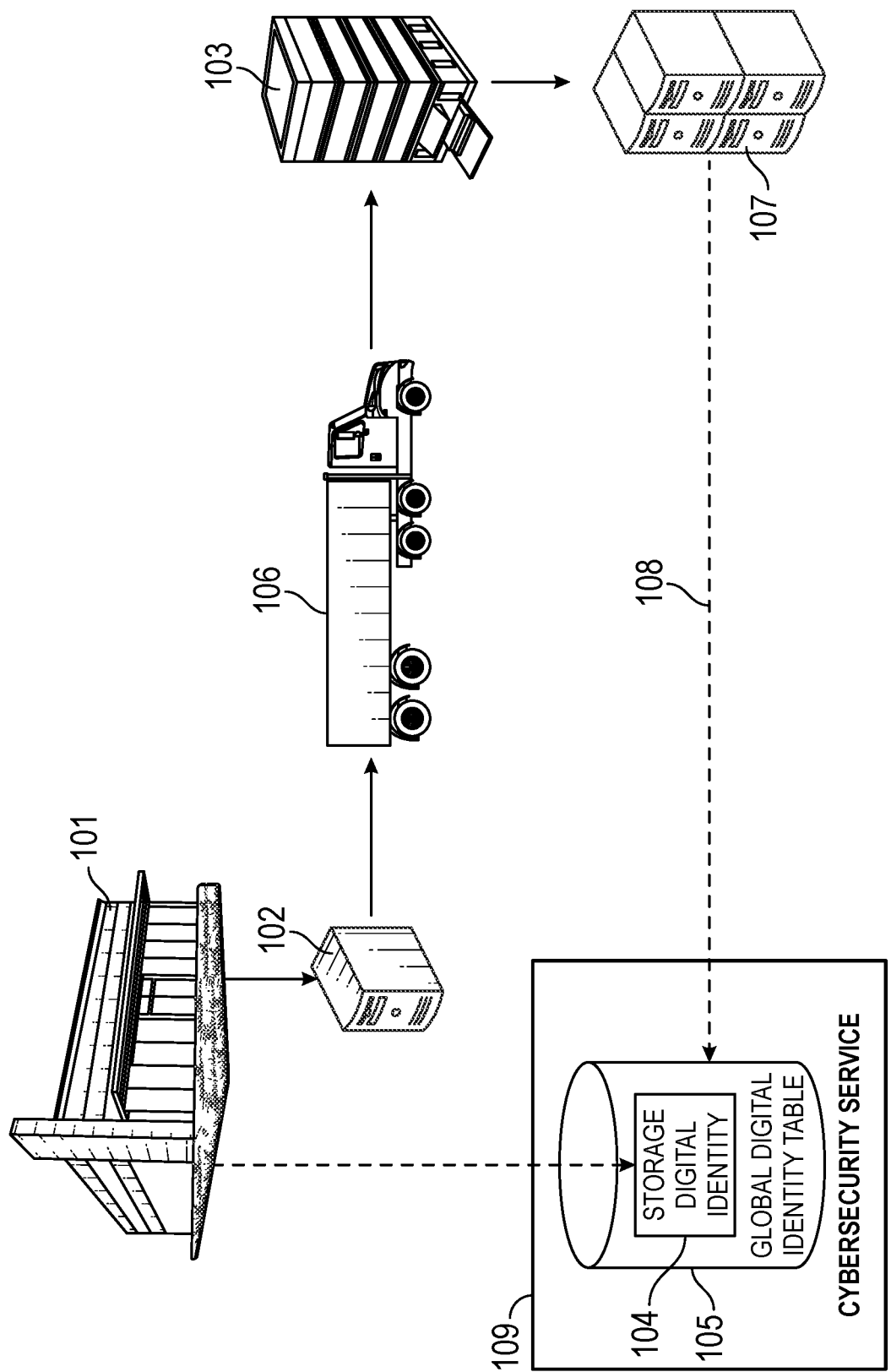
FIG. 1 is a block diagram illustrating a high-level example of the deployment of data center components, such as storage systems.

In the following description, numerous specific details are set forth in order to provide a thorough understanding of embodiments of the present invention. It will be apparent to one skilled in the art that embodiments of the present invention may be practiced without some of these specific details. Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). While embodiments of the present invention have been illustrated and described, the invention is not limited to these embodiments only. Numerous modifica- FIG. 1 is a block diagram illustrating a high-level example of the deployment of data center components, such as storage systems. A manufacturer 101 builds or assembles hardware components, such as storage systems 102, that are adapted for use in an Information Handling System (IHS), data center, or other computing device or system. In other examples, the hardware components may include servers, switches, routers, firewalls, computing resources, or other information security elements and network infrastructure. In the example of a storage system, 102, manufacturer 101 may employ a factory process that includes multiple phases of assembly, validation, and provisioning that must be completed before the storage system 102 is ready to be shipped to a customer 103. Storage system 102 may be purpose-built for a particular customer such that the storage system 102 is assembled and configured according to specifications provided by the customer 103. The initial manufacturing of storage system 102 may include the selection and assembly of various hardware components to meet the specifications of customer 103. Such a factory assembly process may include installing various system and application software on storage system 102. As described above, the installed software components may include standard components and may also include specialized components that have been requested by a specific customer 103 that has contracted for the assembly and delivery of storage system 102. Assembly of the storage system 102 may include various stages such as stages for loading of BIOS and firmware, configuring hardware components, and installing an operating system and other software.

Once assembly has been completed, storage system 102 may be subjected to manual and automated inspections that confirm proper assembly and to identify any defects. After confirming storage system 102 has been assembled without any manufacturing defects, the manufacturer 101 creates a digital identity 104 that is unique for each individual storage system 102. The digital identity 104 may be calculated using the BIOS, firmware, and software that has been installed on storage system 102. The digital identity 104 calculation may also include other elements, such as a model number, serial number, MAC address, or other unique software or hardware identifiers associated with storage system 102. Storage digital identity 104 may function as a certificate that is used to later validate that software components on storage system 102 are the same software components that were installed during assembly at manufacturer 101. The storage digital identity 104 may be stored at a central location, such as in a global digital identity table (GDIT) 105 or other secure database that is maintained by manufacturer 101 or other trusted party.

Storage system 102 is shipped to customer 103 via a supply chain network 106. The supply chain network 106 may include, for example, transportation companies, warehouses, distribution centers, and other third-party entities such as manufacturers, suppliers, handlers, shippers, purchasers, and others involved in the process of making products, such as storage system 102, available to the end consumers, such as customer 103. Once the storage system 102 arrives at customer 103, it is installed and configured for use in data center 107 or customer other system.

Supply chain network 106 is a frequent target for cybercrimes. A weak link in the supply chain 106 provides cybercriminals with a path to access data in a target organization, such as customer 103. An organization's cyber security controls are only as strong as that of the weakest party in the supply chain 106. Often most of supply chain 106 consists of third-party entities that manufacturer 101 and customer 103 have little control over. A cybercrime target, such as customer 103 or the administrator of data center 107, typically has a security system that is virtually impenetrable for even the most sophisticated cyber criminals. Supply chain attacks against third-party channels provide an easier way to access components of data center 107, such as storage system 102, compared to accessing such components after installation.

Supply chain cyber security refers to efforts to enhance cyber security within the supply chain. Typical supply chain cyber security activities for minimizing risks include buying only from trusted vendors and/or physical security. The supply chain can be attacked through malicious software or malicious hardware. For example, malicious software or hardware can be embedded in storage system 102 before it arrives to the customer data center 107. Examples disclosed herein provide protect storage systems against the supply chain threat by creating a digital and monovalent representation of the storage systems supplied to and installed in a data center 107 environment. Malicious and/or unauthorized changes made to the software or hardware of storage system 102 will cause a currently calculated storage digital identity to be different from the original when compared to the storage digital identity 104 stored in global digital identity table 105. This allows data center 107 to detect such changes when storage system 102 is installed. During installation and configuration of a storage system, data center 107 calculates a new or current digital identity for the storage system newly received from supply chain 106. The current digital identity can be used in a query 108 against global digital identity table 105 to verify a match with an expected original storage digital identity 104. The installed storage system 102 or the customer data center 107 may query 108 the global digital identity table 105 directly or may query an intermediary, such as cybersecurity system 109 that hosts or is connected to GDIT 105.

In one example, cybersecurity system 109 is a security platform, such as the CyberSecIQ platform from Dell Inc., that gives customers the ability to be notified and respond to cybersecurity issues and potential security risks. The cybersecurity system 109 may be integrated with tools, such as CloudIQ from Dell Inc., that assist the customer and manufacturer in monitoring storage system parameters. The cybersecurity system 109 has the ability to add the option to detect non-legitimate storage systems by detecting rogue digital identities recorded in the global software digital identity table 105 and notify the customer in near real-time of the threat.

Figure 2:
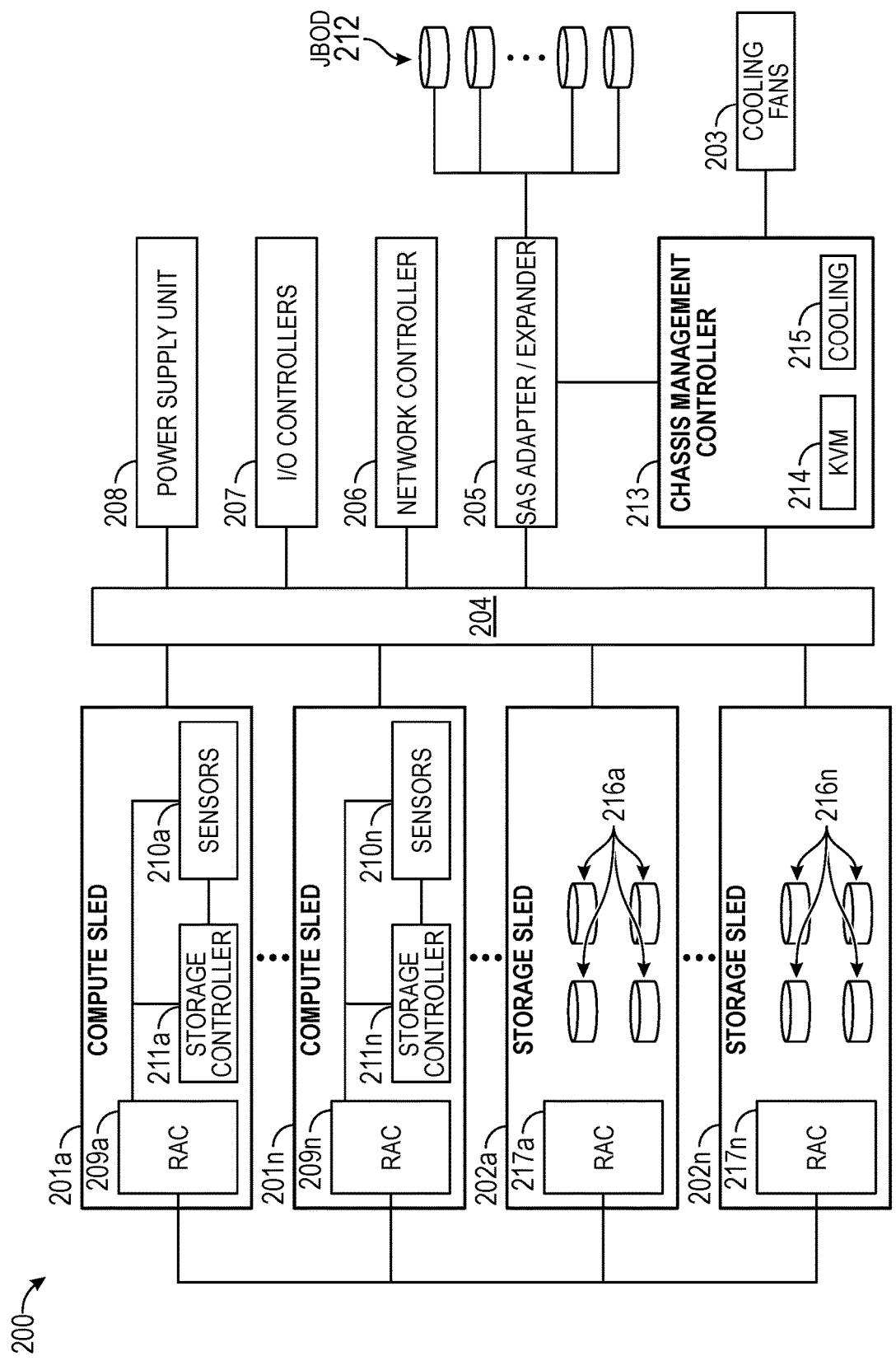
FIG. 2 is a block diagram illustrating certain components of a chassis that may be configured to implement a public cloud or private cloud.

FIG. 2 is a block diagram illustrating certain components of a chassis 200 comprising one or more compute sleds 201a-n and one or more storage sleds 202a-n that may be configured to implement a customer data center 107, including systems and methods described herein for detection of modifications to a storage system. Chassis 200 may include one or more bays that each receive an individual sled, such as compute sleds 201a-n and storage sleds 202a-n. The sleds may be additionally or alternatively referred to as a tray, blade, server, drive, and/or node in various embodiments. A storage system 102 (FIG. 1) may be used as a storage sled 202a-n in some examples. Chassis 200 may support a variety of different numbers (e.g., 4, 8, 26, 32), sizes (e.g., single-width, double-width), and physical configurations of bays. Other embodiments may include additional types of sleds that provide various types of storage and/or processing capabilities. Other types of sleds may provide power management and networking functions. Sleds 201a-n,202a-n may be individually installed and removed from the chassis 200, thus allowing the computing and storage capabilities of a chassis to be reconfigured by swapping the sleds with different types of sleds, in many cases without affecting the ongoing operations of the other sleds installed in the chassis 200.

Multiple chassis 200 are typically housed within a rack, with each chassis installed in one or more slots of the rack. Datacenters, such as those used to implement a public or private cloud platform, may utilize large numbers of racks with various different types of rack configurations. The modular architecture provided by the sleds, chassis, and racks allow for certain resources, such as cooling, power, and network bandwidth, to be shared by the compute sleds 201a-n and storage sleds 202a-n, thus providing efficiency, and supporting various types of computational loads.

Chassis 200 itself may be installed within a rack that provides all or part of the cooling utilized by the components of chassis 200. For airflow cooling, a rack may include one or more banks of cooling fans that may be operated to ventilate heated air from within the chassis 200 that is housed within the rack. The chassis 200 may alternatively or additionally include one or more cooling fans 203 that may be similarly operated to ventilate heated air from within the sleds 201a-n, 202a-n that are installed within the chassis. A rack and a chassis 200 installed within the rack may utilize various configurations and combinations of cooling fans to cool the sleds 201a-n, 202a-n and other components housed within chassis 200.

The sleds 201a-n, 202a-n may be individually coupled to chassis 200 via connectors that correspond to connectors provided by front-facing bays of the chassis 200, where these connectors physically and electrically couple an individual sled to a backplane 204 of the chassis, where the backplane may be additionally or alternatively be referred to as a midplane. Chassis backplane 204 may be a printed circuit board that includes electrical traces and connectors that are configured to route signals between components of chassis 200 that are connected to the backplane 204. In various embodiments, backplane 204 may include various additional components, such as cables, wires, connectors, expansion slots, and multiplexers. In certain embodiments, backplane 204 may be a motherboard that includes various electronic components installed thereon. Such components installed on a motherboard backplane 204 may include components that implement all or part of the functions described with regard to the SAS (Serial Attached SCSI) expander 205, network controller 206, I/O controllers 207, and power supply unit 208.

A compute sled 201a-n may provide computational processing resources that may be used to support a variety of e-commerce, multimedia, business, and scientific computing applications, such as services provided via a cloud implementation. Compute sleds 201a-n are typically configured with hardware and software that provide leading-edge computational capabilities. Accordingly, services provided using such computing capabilities are typically provided as high-availability systems that operate with minimum downtime. As described in additional detail with regard to FIG. 3, compute sleds 201a-n may be configured for general-purpose computing or may be optimized for specific computing tasks.

As illustrated, each compute sled 201a-n includes a remote access controller (RAC) 209a-n, and each storage sled 202a-n includes a remote access controller (RAC) 217a-n. As described in additional detail with regard to FIG. 3, each remote access controller 209a-n, 217a-n provides capabilities for remote monitoring and management of compute sled 201a-n or storage sled 202a-n. In support of these monitoring and management functions, remote access controllers 209a-n may utilize both in-band and sideband (i.e., out-of-band) communications with various components of a compute sled 201a-n and datacenter 200. As illustrated, each compute sled 201a-n may include one or more sensors 210a-n that may generate various types of telemetry data that characterizes aspects of the operation of a respective compute sled 201a-n. For instance, sensors 210a-n may generate and/or collect telemetry data characterizing the performance of processing, networking, power and/or memory components of a compute sled 201a-n, as well as telemetry data from monitoring environmental properties, such as compute sled temperatures. In some embodiments, remote access controller 209a-n may track compute sled resource usage by individual virtual machines operating on compute sleds 201a-n, thus supporting tracking of compute sled resources used by these virtual machines and in detecting suspicious or otherwise unusual activity by file systems implemented by individual users of file sharing systems that may operate through virtual machines, such as described in additional detail below.

Each of the compute sleds 201a-n includes a storage controller 211a-n that may be utilized to access storage drives that are accessible via chassis 200. Some of the individual storage controllers 211a-n may provide support for RAID (Redundant Array of Independent Disks) configurations of logical and physical storage drives, such as storage drives provided by storage sleds 202a-n. In some embodiments, some or all of the individual storage controllers 211a-n may be HBAs (Host Bus Adapters) that provide more limited capabilities in accessing physical storage drives provided via storage sleds 202a-n and/or via SAS expander 205. In some embodiments, storage controller 211a-n may track data storage by individual users accessing a file sharing system via compute sleds 201a-n, thus supporting tracking of storage resources, and detecting activity indicative of a ransomware attacks.

As illustrated, chassis 200 also includes one or more storage sleds 202a-n that are coupled to the backplane 204 and installed within one or more bays of chassis 200 in a similar manner to compute sleds 201a-n. Each of the individual storage sleds 202a-n may include various different numbers and types of storage devices 216a-n. For instance, storage sleds 216a-n-n may include SAS (Serial Attached SCSI) magnetic disk drives, SATA (Serial Advanced Technology Attachment) magnetic disk drives, solid-state drives (SSDs) and other types of storage drives in various combinations. The storage sleds 202a-n may be utilized in various storage configurations by the compute sleds 201a-n that are coupled to chassis 200. As illustrated, each storage sled 202a-n may include one or more sensors. The sensors may generate various types of telemetry data that characterize aspects of the operation of a respective storage sled 202a-n.

In addition to the data storage capabilities provided by storage sleds 202a-n, chassis 200 may provide access to other storage resources that may be installed components of chassis 200 and/or may be installed elsewhere within a rack housing the chassis 200, such as within a storage blade. In certain scenarios, storage resources may be accessed via a SAS expander 205 that is coupled to the backplane 204 of the chassis 200. The SAS expander 205 may support connections to a number of JBOD (Just a Bunch Of Disks) storage drives 212 that may be configured and managed individually and without implementing data redundancy across the various drives 212. The additional storage resources 212 may also be at various other locations within a datacenter in which chassis 200 is installed. Such additional storage resources 212 may also be remotely located. In some instances, each of the storage drives and the SAS expander may generate telemetry and/or error data that may be reported to a chassis management controller 202.

As illustrated, the chassis 200 includes a network controller 206 that provides network access to the sleds 201a-n, 202a-n installed within the chassis. Network controller 206 may include various switches, adapters, controllers, and couplings used to connect chassis 200 to a network, either directly or via additional networking components and connections provided via a rack in which chassis 200 is installed.

Chassis 200 may similarly include a power supply unit 208 that provides the components of the chassis with various levels of DC power from an AC power source or from power delivered via a power system provided by a rack within which chassis 200 may be installed. In certain embodiments, power supply unit 208 may be implemented within a sled that provides chassis 200 with redundant, hot-swappable power supply units.

Chassis 200 may also include various I/O controllers 207 that may support various I/O ports, such as USB ports that may be used to support keyboard and mouse inputs and/or video display capabilities. Such I/O controllers 207 may be utilized by a chassis management controller 213 to support various KVM (Keyboard, Video and Mouse) 214 capabilities that provide administrators with the ability to interface with the chassis 200.

In addition to providing support for KVM 214 capabilities for administering chassis 200, a chassis management controller 213 may support various additional functions for sharing the infrastructure resources of chassis 200. In some scenarios, chassis management controller 213 may implement tools for managing the power 208, network bandwidth 206, and airflow cooling 203 that are available via the chassis 200. As described, the airflow cooling 203 utilized by chassis 200 may include an airflow cooling system that is provided by a rack in which the chassis 200 may be installed and managed by a cooling module 215 of the chassis management controller 213. In some embodiments, the operations of a chassis management controller 213 may be implemented by one of the compute sled or storage sled remote access controllers 209a-n, 209a-n that has been designated and configured for managing chassis-level configurations.

Figure 3:
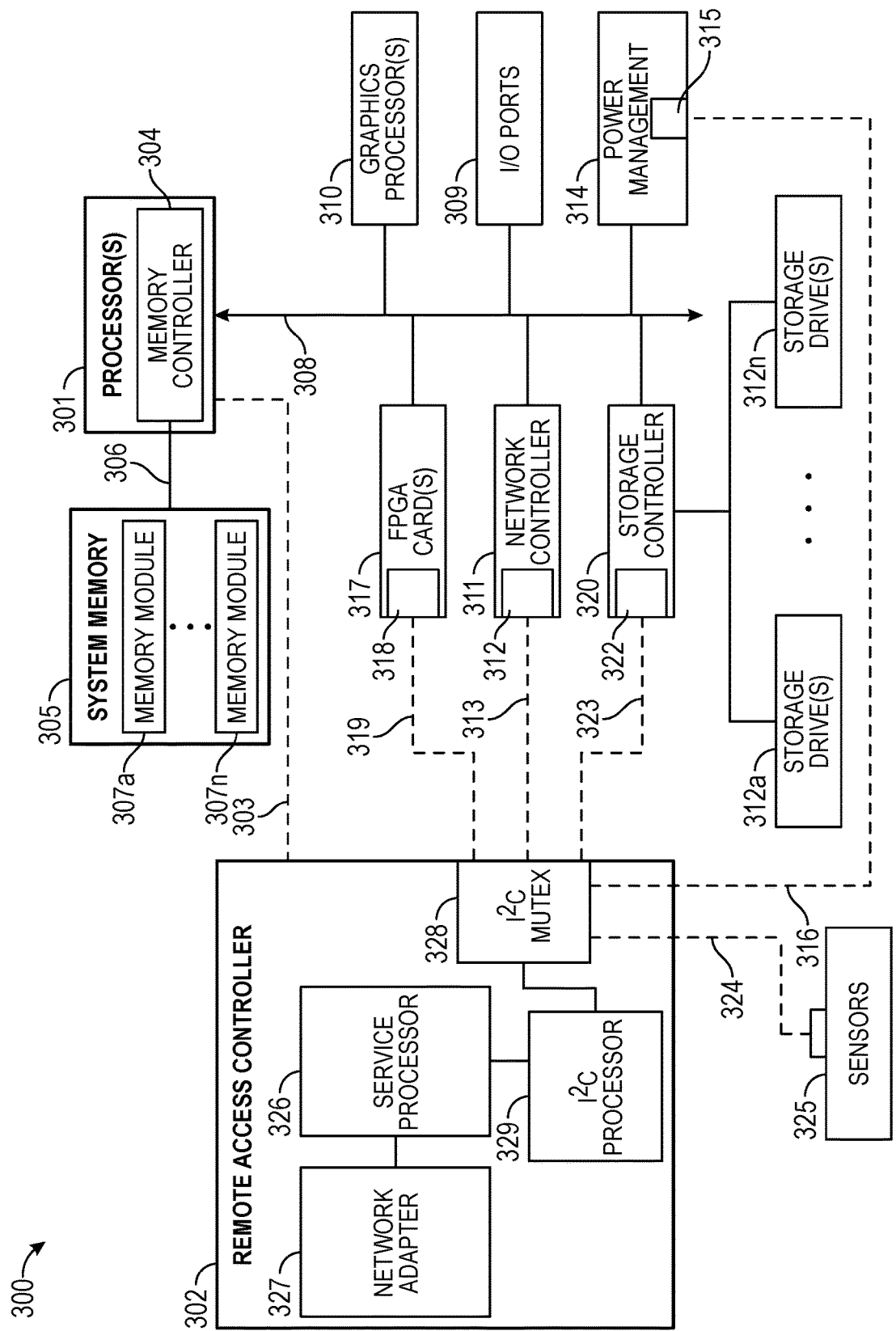
FIG. 3 shows an example of an information handling system configured to implement systems and methods described herein for providing a cloud computing platform.

FIG. 3 shows an example of an IHS 300 configured to implement systems and methods described herein for providing a cloud computing platform. It should be appreciated that although the embodiments described herein may describe an IHS that is a compute sled, server or similar computing component that may be deployed within a rack-mounted chassis, other embodiments may be utilized with other types of IHS s. In the illustrative embodiment, IHS 300 may be a computing component, such as compute sled 201a-n, that is configured to share infrastructure resources provided by a chassis 200.

IHS 300 may be a compute sled, such as compute sleds 201a-n of FIG. 2, that may be installed within a datacenter that may in turn be installed within a rack. Installed in this manner, IHS 300 may utilize shared power, network and cooling resources provided by the datacenter and/or rack. IHS 300 may utilize one or more processors 301. In some embodiments, processors 301 may include a main processor and a co-processor, each of which may include a plurality of processing cores that, in certain scenarios, may be used in operating multiple virtualized computing environments. In certain embodiments, one or all of processor(s) 301 may be graphics processing units (GPUs) in scenarios where IHS 300 has been configured to support functions such as multimedia services and graphics applications.

In some embodiments, processor 301 may be configured to operate as a source of telemetry data providing physical sensor data, such as junction temperatures and power consumption. Processor 201 may also be configured to operate as a source logical telemetry data, such as remaining CPU processing capacity. In some embodiments, processor 301 may be configured by remote access controller 302 to generate telemetry data that is reported to the remote access controller, where the configuration and reporting of this telemetry data may be via a PECI (Platform Environment Control Interface) bus 203 operations.

As illustrated, processor(s) 201 includes an integrated memory controller 304 that may be implemented directly within the circuitry of the processor 301, or the memory controller 304 may be a separate integrated circuit that is located on the same die as the processor 301. The memory controller 304 may be configured to manage the transfer of data to and from the system memory 305 of the IHS 300 via a high-speed memory interface 306. In some embodiments, memory controller 304 may be configured to operate as a source of telemetry data capable of generating reports that are reported to remote access controller 302. The telemetry data reported by memory controller 304 may include metrics such as the amount of available system memory 305 and memory transfer rates via memory interface 306.

The system memory 305 is coupled to processor(s) 301 via a memory bus 306 that provides the processor(s) 301 with high-speed memory used in the execution of computer program instructions by the processor(s) 301. Accordingly, system memory 305 may include memory components, such as such as static RAM (SRAM), dynamic RAM (DRAM), NAND Flash memory, suitable for supporting high-speed memory operations by the processor(s) 301. In certain embodiments, system memory 305 may combine both persistent, non-volatile memory and volatile memory. In certain embodiments, the system memory 305 may be comprised of multiple removable memory modules. The system memory 305 of the illustrated embodiment includes removable memory modules 307a-n. Each of the removable memory modules 307a-n may correspond to a printed circuit board memory socket that receives a specific type of removable memory module 307a-n, such as a DIMM (Dual In-line Memory Module), that can be coupled to the socket and then decoupled from the socket as needed, such as to upgrade memory capabilities or to replace faulty components. Other embodiments of IHS system memory 305 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 300 may utilize a chipset that may be implemented by integrated circuits that are connected to each processor 30 All or portions of the chipset may be implemented directly within the integrated circuitry of an individual processor 301. The chipset may provide the processor(s) 301 with access to a variety of resources accessible via one or more buses 308. Various embodiments may utilize any number of buses to provide the illustrated pathways served by bus 308. In certain embodiments, bus 308 may include a PCIe (PCI Express) switch fabric that is accessed via a PCIe root complex. IHS 300 may also include one or more I/O ports 309, such as PCIe ports, that may be used to couple the IHS 300 directly to other IHSs, storage resources or other peripheral components.

In certain embodiments, a graphics processor 310 may be comprised within one or more video or graphics cards, or an embedded controller, installed as components of the IHS 300. In certain embodiments, graphics processor 310 may be an integrated of the remote access controller 302 and may be utilized to support the display of diagnostic and administrative interfaces related to IHS 300 via display devices that are coupled, either directly or remotely, to remote access controller 302.

In the illustrated embodiments, processor(s) 301 is coupled to a network controller 311, such as provided by a Network Interface Controller (NIC) that is coupled to the IHS 300 and allows the IHS 300 to communicate via an external network, such as the Internet or a LAN. As illustrated, network controller 311 may be instrumented with a controller or other logic unit 312 that supports a sideband management connection 313 with remote access controller 255. Via the sideband management connection 313, network controller 311 may be configured to operate as a source of telemetry data that may include environmental metrics, such as temperature measurements, and logical sensors, such as metrics reporting input and output data transfer rates.

Processor(s) 301 may also be coupled to a power management unit 314 that may interface with the power system unit 208 of the datacenter in which IHS 300 may be installed. As with network controller 311, power management unit 314 may be instrumented with a controller or other logic unit 315 that supports a sideband management connection 316 with remote access controller 302. Via the sideband management connection 316, power management unit 314 may be configured to operate as a source of telemetry data that may include physical sensors, such as a sensors providing temperature measurements and sensors providing power output measurements, and logical sensors, such as capabilities reporting discrete power settings.

As illustrated, IHS 300 may include one or more FPGA (Field-Programmable Gate Array) card(s) 317. Each FPGA card 317 supported by IHS 300 may include various processing and memory resources, in addition to an FPGA integrated circuit that may be reconfigured after deployment of IHS 300 through programming functions supported by the FPGA card 317. FGPA card 317 may be optimized to perform specific processing tasks, such as specific signal processing, security, data mining, and artificial intelligence functions, and/or to support specific hardware coupled to IHS 300. FPGA card 317 may include one or more physical and/or logical sensors. As specialized computing components, FPGA cards may be used to support large-scale computational tasks that may result in the FPGA card 317 generating significant amounts of heat. In order to protect specialized FPGA cards from damaging levels of heat, FPGA card 317 may be outfitted with multiple temperature sensors. FPGA card 317 may also include logical sensors that are sources of metric data, such as metrics reporting numbers of calculations performed by the programmed circuitry of the FPGA. The FPGA card 317 may also include a management controller 318 that may support interoperation was the remote access controller 302 via a sideband device management bus 319.

In certain embodiments, IHS 300 may operate using a BIOS (Basic Input/Output System) that may be stored in a non-volatile memory accessible by the processor(s) 301. The BIOS may provide an abstraction layer by which the operating system of the IHS 300 interfaces with the hardware components of the IHS. Upon powering or restarting IHS 300, processor(s) 301 may utilize BIOS instructions to initialize and test hardware components coupled to the IHS, including both components permanently installed as components of the motherboard of IHS 300, and removable components installed within various expansion slots supported by the IHS 300. The BIOS instructions may also load an operating system for use by the IHS 300. In certain embodiments, IHS 300 may utilize Unified Extensible Firmware Interface (UEFI) in addition to or instead of a BIOS. In certain embodiments, the functions provided by BIOS may be implemented, in full or in part, by the remote access controller 302.

IHS 300 may include one or more storage controllers 320 that may be utilized to access storage drives 321*a-n* that are accessible via the chassis in which IHS 300 is installed. Storage controller 320 may provide support for RAID (Redundant Array of Independent Disks) configurations of logical and physical storage drives 312*a-n*. In some embodiments, storage controller 320 may be an HBA (Host Bus Adapter) that provides more limited capabilities in accessing physical storage drives 321*a-n*. In some embodiments, storage drives 321*a-n* may be replaceable, hot-swappable storage devices that are installed within bays provided by the chassis in which IHS 300 is installed. In some embodiments, storage drives 321*a-n* may also be accessed by other IHSs that are also installed within the same chassis as IHS 300.

In embodiments where storage drives 321*a-n* are hot-swappable devices that are received by bays of datacenter, the storage drives 321*a-n* may be coupled to IHS 300 via couplings between the bays of the chassis and a midplane of IHS 300. Storage drives 321*a-n* may include SAS (Serial Attached SCSI) magnetic disk drives, SATA (Serial Advanced Technology Attachment) magnetic disk drives, solid-state drives (SSDs) and other types of storage drives in various combinations.

In some embodiment, IHS 300 may be used to implement file sharing systems that utilize the Server Message Block (SMB) file sharing protocol. The Server Message Block protocol is a client-server communication protocol used for sharing access to files, and in some cases other resources, over a network. In a file sharing, the SMB protocol provides the inter-process communications that implement protocols for file-level transactions. The SMB protocol is a network file sharing protocol that allows client applications on a user's IHS to setup and conduct remote file level operations, such as reading and writing shared files. In some embodiments, an SMB file sharing system may be implemented using an IHS 300 in which one or more storage drives 321*a-n* are utilized as shared volumes that are used to implement a file system that is shared through use of SMB commands by users of the file sharing system. In some embodiments, the shared volumes of an SMB file sharing system may utilize storage drives on multiple IHSs, such as storage drives 321*a-n* of multiple IHSs that are similarly configured to IHS 300.

As illustrated, storage controller 320 may be instrumented with a controller or other logic unit 322 that supports a sideband management connection 323 with remote access controller 302. Via the sideband management connection 323, storage controller 320 may be configured to operate as a source of telemetry data regarding the operation of storage drives 321*a-n*. For instance, controller 322 may collect metric data characterizing the performance of individual storage drives 321*a-n*, such as available storage capacity and data transfer rates, as well as environmental properties, such as storage drive temperatures. In some embodiments, a storage controller 320 may be utilized in implementing an file sharing system that utilizes one of more of storage drives 321a-n as shared volumes. In such embodiments, storage controller 320 may monitor SMB commands received from users of the file sharing system. As described below, this collected SMB data may be used to compile a profile of normal file sharing activity by individual users, which may then be used to detect anomalous file sharing activity by that user that is consistent with a ransomware attack. In some embodiments, storage controller 320 may track and maintain a record of recent SMB commands issued by a user of IHS 300, in some instances tracking all SMB commands by a user during an ongoing SMB session. In such embodiments, the session data monitored and collected by storage controller 320 may be used to reverse all SMB commands by a user during and SMB session, such as in response to detecting a ransomware pattern in the SMB commands issued by the user.

In certain embodiments, remote access controller 302 may operate from a different power plane from the processors 301 and other components of IHS 300, thus allowing the remote access controller 302 to operate, and management tasks to proceed, while the processing cores of IHS 300 are powered off. As described, various functions provided by the BIOS, including launching the operating system of the IHS 300, may be implemented by the remote access controller 302. In some embodiments, the remote access controller 302 may perform various functions to verify the integrity of the IHS 300 and its hardware components prior to initialization of the IHS 300 (i.e., in a bare-metal state).

In some embodiments, remote access controller 302 may also be directly coupled via I2C couplings 324 with one or more sensors 325, such as sensors that provide measurements of ambient inlet temperatures, outlet airflow temperatures and temperatures at various locations within IHS 300. Sensors 325 coupled directly to remote access controller 302 may also be used in implementing security protocols, such as intrusion detection sensors and user proximity sensors.

Remote access controller 302 may include a service processor 326, or a specialized microcontroller, that operates management software that supports remote monitoring and administration of IHS 300. Remote access controller 302 may be installed on the motherboard of IHS 300 or may be coupled to IHS 300 via an expansion slot provided by the motherboard. In support of remote monitoring functions, network adapter 327 may support connections with remote access controller 302 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 302 may support monitoring and administration of various managed devices 311, 314, 317, 320, 325 of an IHS via a sideband bus interface. For instance, messages utilized in device management may be transmitted using I2C sideband bus connections that may be individually established with each of the respective managed devices 311, 314, 317, 320, 325 through the operation of an I2C multiplexer 328 of the remote access controller. As illustrated, certain of the managed devices of IHS 300, such as FPGA cards 317, network controller 311, storage controller 320 and power management unit 314, are coupled to the IHS processor(s) 301 via an in-line bus 308, such as a PCIe root complex, that is separate from the I2C sideband bus connections 313, 316, 319, 323, 324 used for device management.

In certain embodiments, the service processor 326 of remote access controller 302 may rely on an I2C co-processor 329 to implement sideband I2C communications between the remote access controller 302 and managed components 311, 314, 317, 320, 325 of the IHS. The I2C co-processor 329 may be a specialized co-processor or micro-controller that is configured to interface via a sideband I2C bus interface with the managed hardware 311, 314, 317, 320, 325 of IHS. In some embodiments, the I2C co-processor 329 may be an integrated component of the service processor 326, such as a peripheral system-on-chip feature that may be provided by the service processor 326. Each I2C bus 275a-e is illustrated as single line in FIG. 3. However, each I2C bus 313, 316, 319, 323, 324 may be comprised of a clock line and data line that couple the remote access controller 302 to I2C endpoints 312, 315, 318, 322 on each of the managed components.

In various embodiments, an IHS 300 does not include each of the components shown in FIG. 3. In various embodiments, an IHS 300 may include various additional components in addition to those that are shown in FIG. 3. Furthermore, some components that are represented as separate components in FIG. 3 may in certain embodiments instead be integrated with other components. For example, in certain embodiments, all or a portion of the functionality provided by the illustrated components may instead be provided by components integrated into the one or more processor(s) 301 as a systems-on-a-chip.

In example embodiments, one or more chassis 200 (FIG. 2) having one or more IHS 300 (FIG. 3) as compute and/or storage sleds may be used as a data center 107 (FIG. 1). Storage system 102 may correspond to a storage sled 202a-n in some examples. Embodiments disclosed herein are directed to detecting and preventing modification of storage systems in the supply chain and, in particular, to detecting modifications to software on such storage systems. The use of a storage digital identity that is calculated by the manufacturer remediates the risk of software manipulation by a potential attacker in the supply chain before the storage system reaches the customer data center.

A multi-factor identification is defined for the storage system software and is verified before the device is approved for use. This completely separates a supply-chain attacker from the verification part of the system. There is no single place where an attacker can get approval for the legitimacy of the system. Even if an attacker succeeds in making changes to the storage system software, such as by installing malicious software, that will modify the digital representation of the storage system, which will be detected via a legitimacy verification process that is separate from the customer's data center where the storage system is being installed and used.

Figure 4:
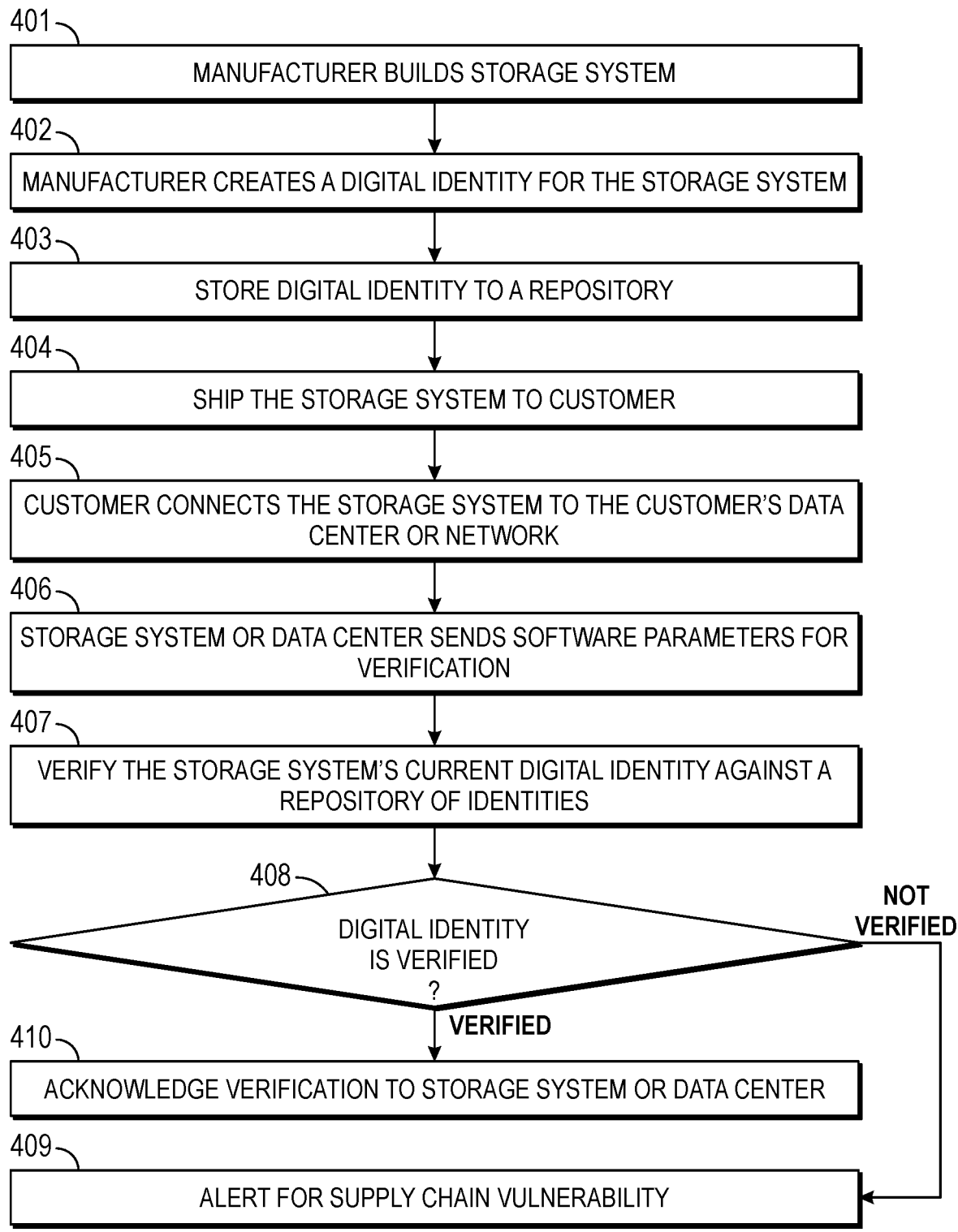
FIG. 4 is a flowchart illustrating a process for verifying the integrity of a storage system according to an example embodiment.

FIG. 4 is a flowchart illustrating a process for verifying the integrity of a storage system according to an example embodiment. In step 401, a manufacturer builds a storage system. The storage system may be a bespoke device that is assembled according to a customer's specifications and/or may be a standard product of the manufacturer that is widely distributed. In step 402, the manufacturer creates a digital identity for the storage system. A unique digital identity may be created for every storage system that is released by the manufacturer. The digital identity is created based upon the software embedded by the manufacturer during production.

For example, the digital identity may be created using parameters of the BIOS, kernel, operating system, and firmware installed on the storage system. A salting parameter may be added to these software parameters and then the result signed with a certificate from a trusted authority, such as the manufacturer. In one example, the digital identity is created using a cryptographic hash function, such as MD5, SHA-256, or SHA-512, wherein the software parameter data is transformed into a secure format that is unreadable without a key. In step 403, the digital identity is stored to a repository, such as Global Digital Identity Table (GDIT) that is maintained by a trusted party, such as the manufacturer. The digital identity, which is based on software parameters, may be associated with a physical feature of the storage system, such as an assigned serial number or model number.

In step 404, the storage system is shipped to the customer. The storage system may be handled by, and exposed to, numerous third parties in the supply chain without manufacturer or customer supervision during shipment. This provides multiple opportunities for malicious modifications to the storage system, such as the installation of unauthorized software and malware. In step 405, after receipt of the device from the supply chain, the customer installs and connects the storage system to the customer's data center, computer network, or system.

In step 406, the storage system sends software parameters for verification. Alternatively, the data center may collect software parameters or identities from the storage system and then send those parameters for verification. In some examples, hardware identities of the storage system are sent for verification. The software parameters may be sent for verification to a repository of digital identities, such as a global digital identity table, or they may be sent to an intermediary such a cybersecurity system to be checked against the repository of digital identities.

In step 407, the storage system's current digital identity is verified against the original digital identity stored in the repository of digital identities, such as storage digital identity 104 saved in GDIT 105 (FIG. 1). In step 408 the success of the verification is determined. If the current digital identity cannot be verified at step 408, the in step 409 an alert is generated to warn parties, such as the manufacturer, customer, data center administrator, and/or supply chain entities, of a potential vulnerability in the supply chain. Alerts may also be issued to warn the customer and/or data center administrator against using the storage system when verification fails. If verification is successful in step 408, then in step 410 the verification is acknowledged to the storage system and/or data center.

In some examples, in step 406, the storage system or data center may extract parameters of the BIOS, kernel, operating system, and/or firmware on the storage system at the time of data center install and send those parameters to a repository of digital identities or a cybersecurity system, which then calculates a current digital identity for the storage system (i.e., calculate the current digital identity remote from the storage system or data center). The repository of digital identities or cybersecurity system then performs the verification in step 407. In other examples, the storage system or data center may extract parameters of the BIOS, kernel, operating system, and/or firmware on the storage system at the time of data center install and locally calculate a current digital identity for the storage system before sending (in step 406) the calculated current digital identity to a repository of digital identities or a cybersecurity system for verification in step 407.

The digital identity of the software system disrupts the effectiveness of any intervention by a cybercriminal against the storage system during the supply chain process. The digital identity is used to verify and authenticate that no one made unauthorized or malicious changes to the storage system during the transportation phase and that no malicious software was embedded in the storage system by an attacker.

This process will also detect rogue digital identity records that are not in the repository or global software digital identity table, which contains all the digital identities that are approved and validated by the manufacturer. Upon detection of a non-valid digital identity record, the cybersecurity system will generate a notification to the customer regarding the discovered threat including a suggested solution. Also, the cybersecurity system will notify the manufacturer's security team of a potential Zero-Day vulnerability discovery or a problem in the specific supply chain. The manufacturer and customer may then respond to the attack, such as by performing a remediation step and forcing the storage system to stop the attack.

The systems and method disclosed herein allow for the manufacturer and customer to deny the transportation of hostile software to a customer site by reinforcing rogue software delivery protection and detecting integrity deviations in storage software, which protects data center environments. Monovalent representations are created for every storage system that is released from a manufacturer's factory. This provides a new verification and integrity validation methodology for the storage systems. By creating the digital identity for every storage system, any rouge changes in the storage system during transportation can be identified.

This innovation allows the manufacturer and customer to be notified if there was an exploitation of a storage system during transportation. When a system detects an unauthorized and/or malicious digital identity, this means that an attacker found a way to expose the storage system and is an initial indication that there is a serious security breach in the storage system.

The malicious actions can be detected remote from affected device. Attack detection in an isolated and protected cybersecurity system environment eliminates the attackers' influence on the evaluation process. A potential untrusted environment (e.g., the supply chain and data center) is separated from the evaluation platform mechanism (e.g., a cybersecurity system and global software digital identity table) and does not allow the attacker to affect the comparison results. The storage system's digital identity is validated in the global software digital identity table during manufacture. The storage system and validates its digital identity when the storage system is connecting for the first time to the data center using the cybersecurity system. An attacker can expose the storage system and add malicious software during transportation; however, in this case, the attacker manipulates on the local information. By requiring an additional verification process, the digital identity is validated against the global software digital identity table, which allows the remote data center to avoid the attacker's manipulations to the storage system.

The response and remediation for an attack on the device can be immediate. This may be accomplished, for example, by triggering a shutdown of the storage system as soon as the digital identity verification fails. Once shutdown, the system cannot harm the customer's data center or network.

In some examples, unauthorized activity for storage devices may be display in a security dashboard at the cybersecurity service or at the data center. When the intrusion is detected by the presence of an unknown digital identity, the cybersecurity system generates an alert that includes the attacked data, consequent risk, and coping or remediation methods. The cybersecurity system holds approved digital identity records in an approved list and based on that list will eliminate tampered storage systems from being supplied to the manufacturer's customers.

In an example method for validating digital components, a process comprises manufacturing a digital component for a computer network, wherein the digital component includes embedded software, creating a unique digital identity for the digital component using parameters of the embedded software, and storing the unique digital identity to a global repository. The digital component may be a storage system, such as (1) a direct-attached storage (DAS) system that is directly attached to computer or (2) a component of a storage area network (SAN) or other network of storage devices that provides a shared pool of storage space and is accessed by multiple servers. The embedded software may comprise a BIOS, kernel, operating system, and/or firmware. The unique digital identity may be created using a cryptographic hash function that is applied to parameters of the embedded software. A salting parameter may be added to parameters of the embedded software to create the unique digital identity. The unique digital identity may be signed with a certificate from a manufacturer of the digital component. The digital component is typically under a manufacturer's control and is not shipped to the end user until the unique digital identity is stored to the global repository. The global repository is a global digital identity table.

The method may further comprise shipping the digital component to an end user, receiving a query at the global repository to verify an installed digital identity associated with a component being installed in an end user computer network, and determining whether the installed digital identity matches the unique digital identity. The end user computer network may be an information handling system (IHS). The end user computer network may alternatively be a data center that is used in an enterprise network, such as a private cloud platform, or that supports a public cloud platform. The query received at the global repository may be sent from the digital component or may be sent from a data center, such as the end user computer network in which the digital component is being installed. The query received at the global repository may be the installed digital identity. Alternatively, the query received at the global repository may comprise parameters of the embedded software from a storage system being installed at a data center, and the parameters of the embedded software are used to generate an installed digital identity for verification.

In an example method for verification of a storage system, a process comprises identifying a storage system being installed in a data center, extracting parameters of software embedded on the storage system, and sending the parameters to a repository of digital identities for verification of the storage system. The parameters may be sent to the repository as a calculated digital identity that is generated using a cryptographic hash function applied to the parameters. The parameters may be sent to the repository via a cybersecurity system.

The method for verification may further comprise sending an alert indicating a supply chain vulnerability if the parameters are not verified for the storage system or sending a response indicating that the storage system has been verified.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid-state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A method comprising:
    manufacturing a plurality of Information Handling System (IHS) implementations for a computer network, wherein each IHS of the plurality of IHS implementations comprises a plurality of embedded devices, wherein each embedded device of the plurality of embedded devices in each IHS includes embedded software comprising firmware, and wherein each IHS of the plurality of IHS implementations comprise a kernel, and an operating system (OS);

extracting, by at least one IHS of the plurality of IHS implementations, parameters of the at least one IHS, comprising: a hardware identifier unique to the at least one IHS, and parameters of: the firmware from the plurality of devices, the kernel, and the OS in the at least one IHS;

sending, by the at least one IHS, an electronic message comprising the extracted parameters of the at least one IHS to a global repository remote from the at least one IHS, wherein the electronic message is configured to cause the global repository to calculate a unique installed digital identity of the at least one IHS based on the extracted parameters of the at least one IHS and a salting parameter added to the extracted parameters by the global repository;

storing, by the global repository, the unique installed digital identity of the at least one IHS;

shipping the at least one IHS to an end user;

receiving a query at the global repository to verify an installed digital identity associated with the at least one IHS, wherein the query comprises current parameters of the at least one IHS, and wherein the global repository calculates a current digital identity of the at least one IHS based on the current parameters and the salting parameter; and determining, by the global repository, whether the unique installed digital identity matches the current digital identity, based on comparing the current digital identity with the unique installed digital identity.

2. The method of claim 1, wherein the at least one IHS further comprises a storage system.

3. The method of claim 1, wherein the computer network further comprises a data center.

4. The method of claim 1, wherein the computer network further comprises an intermediary cybersecurity system operably coupled between the at least one IHS and the global repository, and wherein the intermediary cybersecurity system is configured to host a global identity table (GDT), and wherein the method further comprises sending, by the at least one IHS to the intermediary cybersecurity system, the query.

5. The method of claim 1, wherein the hardware identifier unique to the at least one IHS further comprises at least one of: a serial number, or a MAC address.

6. The method of claim 1, wherein the unique installed digital identity and the current digital identity are created using a cryptographic hash function applied to the parameters of the at least one IHS and the salting parameter.

7. The method of claim 1, wherein the unique installed digital identity is signed with a certificate from a manufacturer of the at least one IHS.

8. The method of claim 1, wherein the at least one IHS is under a manufacturer's control and is not shipped to the end user until the unique installed digital identity is stored to the global repository.

9. The method of claim 1, wherein the global repository comprises a global digital identity table (GDT) comprising a plurality of unique installed digital identities calculated by the global repository as a function of parameters of a respective plurality of IHS implementations and a respective plurality of unique salting parameters.

10. The method of claim 1, wherein the end user has a computer network comprising a data center.

11. The method of claim 4, wherein the method further comprises in response to the intermediary cybersecurity system determining the query does not comprise parameters from a rogue system, sending, by the intermediary cybersecurity system, the query to the global repository.

12. The method of claim 1, wherein the query received at the global repository is sent from a data center in which the at least one IHS is being installed.

13. The method of claim 1, wherein the query received at the global repository comprises a unique installed digital identity calculated by the at least one IHS.

14. The method of claim 1, wherein the query received at the global repository comprises parameters of embedded software from a storage system being installed at a data center, and wherein the parameters of the embedded software are used to generate a unique installed digital identity for verification.

* * * * *